(12) United States Patent
Gurreri

(10) Patent No.: US 8,794,849 B2
(45) Date of Patent: Aug. 5, 2014

(54) CONNECTOR SYSTEM WITH PHYSICAL SECURITY FEATURES

(71) Applicant: Tyco Electronics Corporation, Berwyn, PA (US)

(72) Inventor: Michael Lawrence Gurreri, York, PA (US)

(73) Assignee: Tyco Electronics Corporation, Berwyn, PA (US)

(*) Notice: Subject to any disclaimer, the term of this patent is extended or adjusted under 35 U.S.C. 154(b) by 0 days.

(21) Appl. No.: 13/839,732

(22) Filed: Mar. 15, 2013

(65) Prior Publication Data

US 2013/0202254 A1 Aug. 8, 2013

Related U.S. Application Data

(63) Continuation of application No. 13/447,613, filed on Apr. 16, 2012, which is a continuation of application No. 12/876,943, filed on Sep. 7, 2010, and a continuation-in-part of application No. 12/061,064, filed on Apr. 2, 2008, now Pat. No. 7,789,572, and a continuation-in-part of application No. 11/930,751, filed on Oct. 31, 2007, now Pat. No. 7,651,277, and a continuation-in-part of application No. 11/254,356, filed on Oct. 20, 2005, now Pat. No. 7,325,976, and a continuation-in-part of application No. 11/108,489, filed on Apr. 18, 2005, now Pat. No. 7,118,286, and a continuation-in-part of application No. 11/025,090, filed on Dec. 29, 2004, now Pat. No. 7,182,523, and a continuation-in-part of application No. 10/982,374, filed on Nov. 5, 2004, now Pat. No. 7,207,724, and a continuation-in-part of application No. 09/908,140, filed on Jul. 17, 2001, now Pat. No. 6,960,025.

(60) Provisional application No. 60/218,705, filed on Jul. 17, 2000.

(51) Int. Cl.
*G02B 6/38* (2006.01)
*G02B 6/36* (2006.01)

(52) U.S. Cl.
CPC ............ *G02B 6/36* (2013.01); *G02B 6/3893* (2013.01); *G02B 6/3881* (2013.01); *G02B 6/3873* (2013.01); *G02B 6/3831* (2013.01)

USPC ............................................ 385/58; 439/680

(58) Field of Classification Search
USPC .............. 385/56, 58, 76, 77, 78, 85; 439/488, 439/677, 680
See application file for complete search history.

(56) References Cited

U.S. PATENT DOCUMENTS

| 4,076,361 A | 2/1978 | Campbell |
| 4,531,798 A | 7/1985 | Baur et al. |

(Continued)

FOREIGN PATENT DOCUMENTS

| WO | 2005004285 | 1/2005 |
| WO | 2005029147 | 3/2005 |

OTHER PUBLICATIONS

AMP Incorporated, SDL Top-Entry and Side-Entry PC Board Receptacles Application Specification 114-2081, Mar. 26, 1996, Rev. D., pp. 1 to 11.

(Continued)

*Primary Examiner* — Thanh Tam Le
(74) *Attorney, Agent, or Firm* — Saul Ewing LLP; Stephen J. Driscoll

(57) ABSTRACT

A connector set of discriminating receptacles and plugs, the connector set comprising a plurality of different receptacles and a plurality of different plugs for optically or electrically coupling with the different receptacles, each different plug having a unique first geometry, each different receptacle having a unique second geometry; wherein each unique first geometry corresponds to one, and only one, unique second geometry such that the plugs and receptacles having corresponding unique first and second geometries in the connector set are mating pairs; wherein each mating pair is marked with a matching visual identification different from the plugs and receptacles having different first and second geometries in the connector set, the visual identification being at least one of color, alphanumerical, or symbol.

30 Claims, 12 Drawing Sheets

(56) References Cited

U.S. PATENT DOCUMENTS

| | | | |
|---|---|---|---|
| 4,596,436 A | 6/1986 | Kraemer et al. | |
| 4,746,298 A | 5/1988 | Hollander | |
| 4,764,129 A * | 8/1988 | Jones et al. | 439/677 |
| 4,781,626 A | 11/1988 | Lazarchik | |
| 4,784,614 A * | 11/1988 | Sadigh-Behzadi | 439/488 |
| 4,864,129 A | 9/1989 | Paske et al. | |
| 4,875,753 A | 10/1989 | Kalomiris | |
| 5,044,994 A | 9/1991 | Van Woensel | |
| 5,167,542 A | 12/1992 | Haitmanek | |
| 5,244,402 A | 9/1993 | Pasterchick, Jr. et al. | |
| 5,274,729 A | 12/1993 | King et al. | |
| 5,335,301 A | 8/1994 | Newman et al. | |
| 5,342,221 A * | 8/1994 | Peterson | 439/677 |
| 5,420,951 A | 5/1995 | Marazzi et al. | |
| 5,423,692 A | 6/1995 | Francis | |
| 5,481,634 A | 1/1996 | Anderson et al. | |
| 5,521,997 A | 5/1996 | Rovenolt et al. | |
| 5,579,425 A * | 11/1996 | Lampert et al. | 385/59 |
| 5,628,648 A | 5/1997 | Higgins, Jr. et al. | |
| 5,675,682 A | 10/1997 | De Marchi | |
| 5,692,080 A | 11/1997 | Lu | |
| 5,726,424 A | 3/1998 | Koether | |
| 5,729,644 A * | 3/1998 | Shiflett et al. | 385/59 |
| 5,828,804 A | 10/1998 | Akins et al. | |
| 5,902,155 A | 5/1999 | Polgar et al. | |
| 5,923,805 A | 7/1999 | Anderson et al. | |
| 6,019,521 A | 2/2000 | Manning et al. | |
| 6,130,977 A | 10/2000 | Rosson | |
| 6,149,313 A | 11/2000 | Giebel et al. | |
| 6,179,477 B1 | 1/2001 | De Marchi | |
| 6,183,287 B1 | 2/2001 | Po | |
| 6,200,040 B1 | 3/2001 | Edwards et al. | |
| 6,220,763 B1 | 4/2001 | Stephenson | |
| 6,224,268 B1 | 5/2001 | Manning et al. | |
| 6,247,850 B1 | 6/2001 | Edwards et al. | |
| 6,354,746 B1 | 3/2002 | Lee | |
| 6,357,930 B1 | 3/2002 | Wiltjer | |
| 6,383,032 B1 * | 5/2002 | Gerberding | 439/681 |
| 6,419,400 B1 | 7/2002 | Wiltjer et al. | |
| 6,422,759 B1 | 7/2002 | Kevern | |
| 6,435,730 B1 | 8/2002 | Kevern et al. | |
| 6,543,941 B1 | 4/2003 | Lampert | |
| 6,769,813 B2 | 8/2004 | Cheng | |
| 6,960,025 B2 | 11/2005 | Gurreri | |
| 7,118,286 B2 | 10/2006 | Gurreri et al. | |
| 7,182,523 B2 | 2/2007 | Abendschein et al. | |
| 7,207,724 B2 | 4/2007 | Gurreri | |
| 7,258,493 B2 * | 8/2007 | Milette | 385/55 |
| 7,325,976 B2 | 2/2008 | Gurreri et al. | |
| 7,336,883 B2 | 2/2008 | Scholtz | |
| 7,500,790 B2 | 3/2009 | Erdman et al. | |
| 7,651,277 B2 | 1/2010 | Gurreri | |
| 7,789,572 B2 | 9/2010 | Gurreri et al. | |
| 2011/0058774 A1 | 3/2011 | Gurreri et al. | |

OTHER PUBLICATIONS

Patent Trial and Appeal Board, "Decision-Motions-BD.R. 125(a)", Paper 107, *Gurreri* v. *Milette*, Interference No. 105,863, filed Dec. 13, 2012.
Patent Trial and Appeal Board, "Decision on Request for Rehearing-BD.R. 125", Paper 1147, *Gurreri* v. *Milette*, Interference No. 105,863, filed Feb. 1, 2013.
Patent Trial and Appeal Board, "Decision-Priority", Paper 171, *Gurreri* v. *Milette*, Interference No. 105,863, filed Nov. 18, 2013.
Patent Trial and Appeal Board, "Judgment", Paper 172, *Gurreri* v. *Milette*, Interference No. 105,863, filed Nov. 18, 2013.

* cited by examiner

CONNECTOR SYSTEM WITH PHYSICAL SECURITY FEATURES

CROSS REFERENCE TO RELATED APPLICATIONS

This present application is a continuation of application Ser. No. 13/447,613, filed Apr. 16, 2012, which is a continuation of application Ser. No. 12/876,943, filed Sep. 7, 2010, currently pending; a continuation-in-part of application Ser. No. 12/061,064, filed Apr. 2, 2008, now U.S. Pat. No. 7,789,572; a continuation-in-part of application Ser. No. 11/930,751, filed Oct. 31, 2007, now U.S. Pat. No. 7,651,277; a continuation-in-part of application Ser. No. 11/254,356, filed Oct. 20, 2005, now U.S. Pat. No. 7,325,976; a continuation-in-part of application Ser. No. 10/982,374, filed Nov. 5, 2004, now U.S. Pat. No. 7,207,724; a continuation-in-part of application Ser. No. 11/025,090, filed Dec. 29, 2004, now U.S. Pat. No. 7,182,523; a continuation-in-part of application Ser. No. 11/108,489, filed Apr. 18, 2005, now U.S. Pat. No. 7,118,286; a continuation-in-part of application Ser. No. 09/908,140, filed Jul. 17, 2001, now U.S. Pat. No. 6,960,025, which is a non-provisional application of Provisional Application No. 60/218,705, filed Jul. 17, 2000. The application hereby claims priority to all of the aforementioned applications, which are also all hereby incorporated by reference in their entirety.

FIELD OF INVENTION

The present invention relates generally to connectors for use in telecommunication networks such as voice, data or video networks. More specifically, to a connector system in which only certain plugs can mate with certain receptacles to provide discriminating access to particular information networks.

BACKGROUND

A need has developed to limit user access in data networks for security or other purposes. In recent years, buildings/offices are being equipped with different information networks, each having access to different data. It is important to restrict access to these networks to only authorized users. While some restrictions may be achieved using software approaches, such as passwords, the applicants have identified the need to restrict access further using some type of "physical barrier" to the networks. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a connector system which uses physical barriers to prevent unauthorized users from connecting to data networks. More specifically, the applicants recognize that the best protection against unauthorized users "hacking" into data networks containing confidential information is to prevent them from even connecting to the network. This can be accomplished using physical barriers which prevent plugs from mating with receptacles. To this end, the present invention facilitates discriminating mating among similar, but different, plugs and receptacles by using a system of geometrically matched connector components which allows certain combinations of plugs and receptacles—i.e., mating pairs—to mate, while preventing other combinations from mating. Thus, the connector system of the present invention imparts physical security to a particular data network by ensuring that only authorized users who possess a particular connector component can physically connect to the particular data network.

In a preferred embodiment, the network comprises: (a) a set of optical plugs, each plug having a housing and a ferrule, the housing having a front and back orientation and having a front face defining an opening, the ferrule being disposed within the opening, the housing defining a first keying element on the front face around the opening, the keying element for each optical plug of the set of optical plugs being different; and (b) a set of optical receptacles, each receptacle having an opening to receive the plug and a ferrule-receiving portion to receive the ferrule, the ferrule-receiving portion defining a second keying element to cooperate with the first keying element, the second keying element for each receptacle of the set of the optical receptacles being different and being adapted to cooperate with one and only one of the first keying elements, wherein plugs and receptacles having keying elements that cooperate are mating pairs.

Having the keying element located on the face of the plug provides for a number of benefits. First, these features can be molded with a relatively small change to the mold dies. Specifically, the opening around the ferrule is typically defined in the molding process by a core pin which is inserted into the outer mold. Changing core pin configurations is a relatively inexpensive and easy step compared to altering the configuration of the outer molds. Therefore, as mentioned above, the connector system of the present invention provides for a variety of different plug configurations with only slight modifications to the molding process.

Having the security features on the front face of the plug also provides for an early indication of non-mateability. Specifically, since the features are located on essentially the leading edge of the plug, they are positioned optimally to "stub" as soon as possible when a plug is inserted into a non-mating receptacle. The applicants recognize that interference between connector components which are non-mating should be made as soon as possible to minimize the possibility of coupling light between connectors. That is, if close enough, optical connectors are able to couple, albeit with high loss, even if the connectors are not mechanically engaged. This condition can be meliorated by preventing the light carrying elements from getting too close—hence the desire to stub early. Stubbing early also provides an early signal to the user that the plug is non-mating and avoids the tendency of trying to force a plug into a non-mating receptacle.

Additionally, by locating the keying feature on the leading surface of the plug, the corresponding keying feature on the receptacle may be located internally and still provide an early indication of non-mateability. This is beneficial since it is desirable to locate the keying feature of the receptacle internally to minimize the ability of the keying feature to be tampered with or otherwise overridden. As discussed below, this is of particular importance in the configuration of the MT-RJ and LC connectors in which the plug defines the slot and the receptacle defines the key. If the key is removed, the security feature is breached. Having the key located within the receptacle reduces this risk.

Yet another benefit of having the keying features located on the front face of the plug is the visual indication the plug provides with respect to its keying features. That is, one can readily determine the keying configuration of the plug by visual inspection of its front face. There is no need to look into an opening to inspect the internal geometry of the plug to determine its keying configuration.

Another aspect of the present invention is an economical process for producing the plugs by altering their geometry at their front end though a simple mold modification. In a preferred embodiment, the process comprises: (a) molding a first housing for a first plug of a set of plugs using a core pin to define an opening having a first keying element in a first position; and (b) molding a second housing for a second plug of the set of plugs by adjusting only the core pin to define the opening having a first keying element in a second position different than the first position.

Yet another embodiment of the present invention is a multi-connector assembly in which two or more of the connectors have different secure features. In one embodiment, the connector system comprising a multi-plug connector, each plug having a housing and a ferrule, the housing having a front and back orientation and having a front face defining an opening, the ferrule being disposed within the opening, the housing defining a first keying element on the front face around the opening, at least two housings of the multi-plug connector having different the first keying elements.

BRIEF DESCRIPTION OF DRAWINGS

FIG. 3A shows an end view of second plug with a first keying element (a slot) in a second position which accepts a second keying element (a key) of a second mating receptacle as shown in FIG. 49a.

DETAILED DESCRIPTION OF PREFERRED EMBODIMENTS

Figure 1:
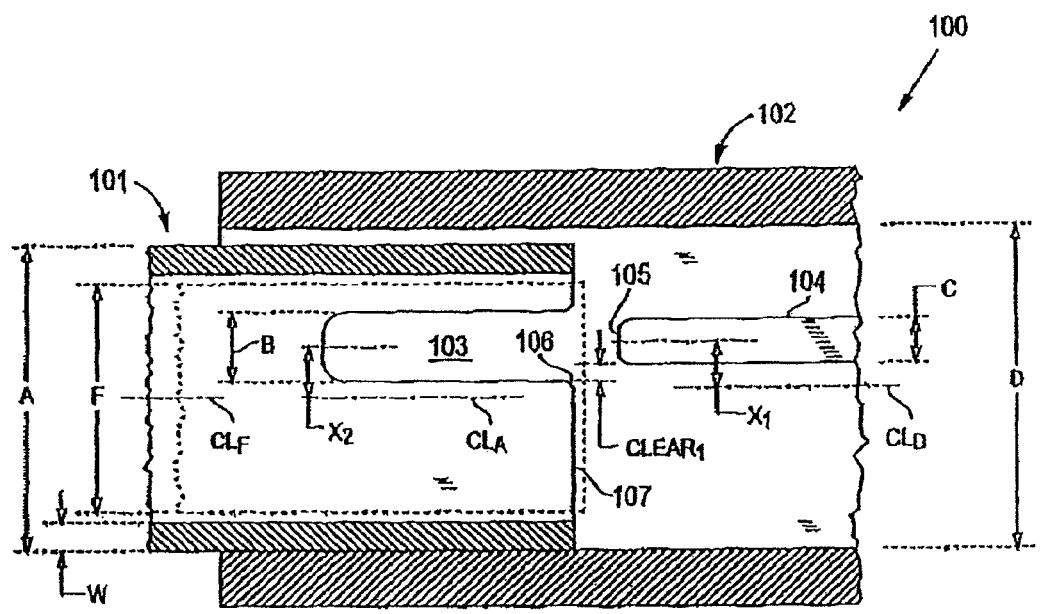
FIG. 1 shows a mating pair of the present invention in which a plug is being inserted into a receptacle.

The present invention relates to a connector system comprising a series of connector components which interconnect with each other in a discretionary way. Referring to FIG. 1, a preferred embodiment of a mating plug 101 and receptacle 100 of the connector system is illustrated. As shown, the plug 101 is partially inserted into the receptacle 100, which, in this embodiment, is a jack having a tub portion 102. Although a jack is discussed herein in detail, it should be understood that the receptacle of the present invention is not restricted to a jack and may be any structure configured to receive a plug, including, for example, an adapter for connecting two plugs together or an integral connector on an active device (e.g., transceiver) or passive device (e.g., splitter).

The plug typically contains a conductive element, such a fiber or wire, which mates with a similar element in the receptacle. In fiber optic applications, it is common for the conductive element to be contained in a ferrule, which in turn is housed by the plug. In a preferred embodiment, the ferrule is an MT-type ferrule.

The outer surface of the plug 101 and the inner surface of the tub 102 have first and second geometries, respectively, which cooperate to allow only certain pairs of plugs and receptacles to mate (herein Amating pairs, @ Amating plug and jack, @ or Akeyed pair@), and which physically interfere for all other combinations of plugs and jacks (herein Anon-mating pairs, @Anon-mating plugs and jacks @ or Anon-keyed pairs @), thereby preventing non-mating plugs and jacks from effecting an optical or electrical coupling.

The first and second geometries may embody any known keying mechanism which discriminates between connector components. Such keying mechanisms include, for example, a key and slot relationship between the plug and jack, a receptacle dimensioned to receive only certain sized or shaped plugs, and even a magnetic signature for either attracting (for mating pairs) and repulsing (non-mating pairs). Preferably, the keying mechanism involves just a slight modification to the plug and jack such that essentially the same molds can be used to manufacture connectors of different keyed pairs. Although molding is preferred, it is should be understood that other techniques for producing the first and second geometries can be used including, for example, over molding and machining.

In a preferred embodiment, the invention uses a key and slot mechanism. For simplicity, the term "keying elements" refers collectively to the key and the slot. Specifically, the slot can be embodied in the first or second geometry and the key can be embodied in the other geometry. In the particularly preferred embodiment shown in FIGS. 1-4, the key is part of the second geometry, while the slot is part of the first geometry; that is, the plug 101 has a slot 103 and the tub portion 102 of the jack has a key 104.

This configuration is preferred since the key may cooperate with other Aribs @ on the connector for pre-alignment purposes. More specifically, with particular reference to FIG. 3, an end view of housing 301 of the plug 101 is shown. The housing comprises four walls each wall having a slot 103, 302a, 302b, and 302c, respectively. FIG. 4 depicts an end view of housing 401 of the tub 400 in which the key 104 and ribs 402a, 402b, and 402c are disposed on the walls of the housing. The key 104 and the ribs 402a, 402b, and 402c cooperate with the slots 103, 302, 302a, 302b, and 302c, respectively, to effect pre-alignment of the ferrule located within the plug with the jack before final mating of the connector plug with the connector jack. The final mating may be between the conductive elements of the connector system, such as, for example, between a couple of MT-type ferrules, which employ precise alignment pins/receiving holes on the ferrule face. Such ferrules are well known in the art. By pre-aligning the MT ferrules through the synergistic use of the key and slot, the inter-engagement of the closely-toleranced alignment pins/receiving holes is facilitated. The above-described synergistic keying and aligning feature of the present invention is realized with the MT-RJ connector (Tyco Electronics, Harrisburg, Pa.).

Figure 2:
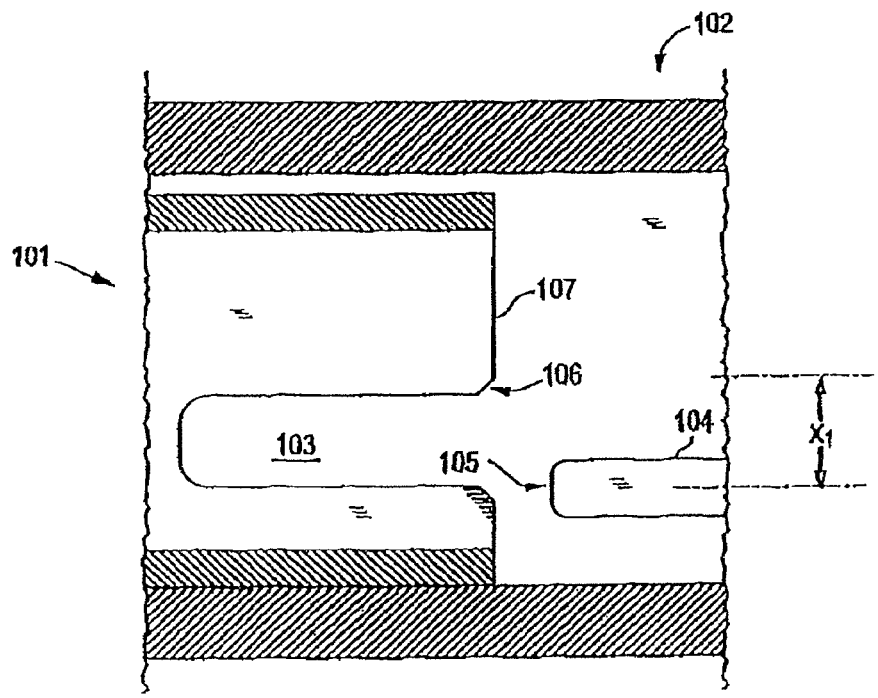
FIG. 2 shows a non-mating pair in which a plug has a slot which is not in the proper position to accept a key of a receptacle.

In a preferred embodiment, the mating end of the key 104 contains a flat portion shown as 105 and the mating end of the plug 101 has a chamfers 106 on the corners of the edges of the slot 103, while the remainder of the mating end of the plug comprises a flat portion 107. The radius corners on the key 106 and the chamfers on the plug 107 work as a guiding device and provide for the necessary alignment between the key and the slot when the plug is inserted into the tub of the jack. On the other hand, as shown in FIG. 2, when a user attempts to mate two non-mating plug and jack components, the flat portion of the key 105 contacts the flat portion of the plug 107 and provides for definite physical interference between the plug and jack when the slot and key do not correspond. Accordingly, the use of this geometry prevents a user from forcing two non-mating plugs and jacks together. Therefore, the physical interference provided between the flat portion 105 of the tub and the flat portion 107 of the key assures that only desired combinations of plugs and jacks will mate.

Figure 5:
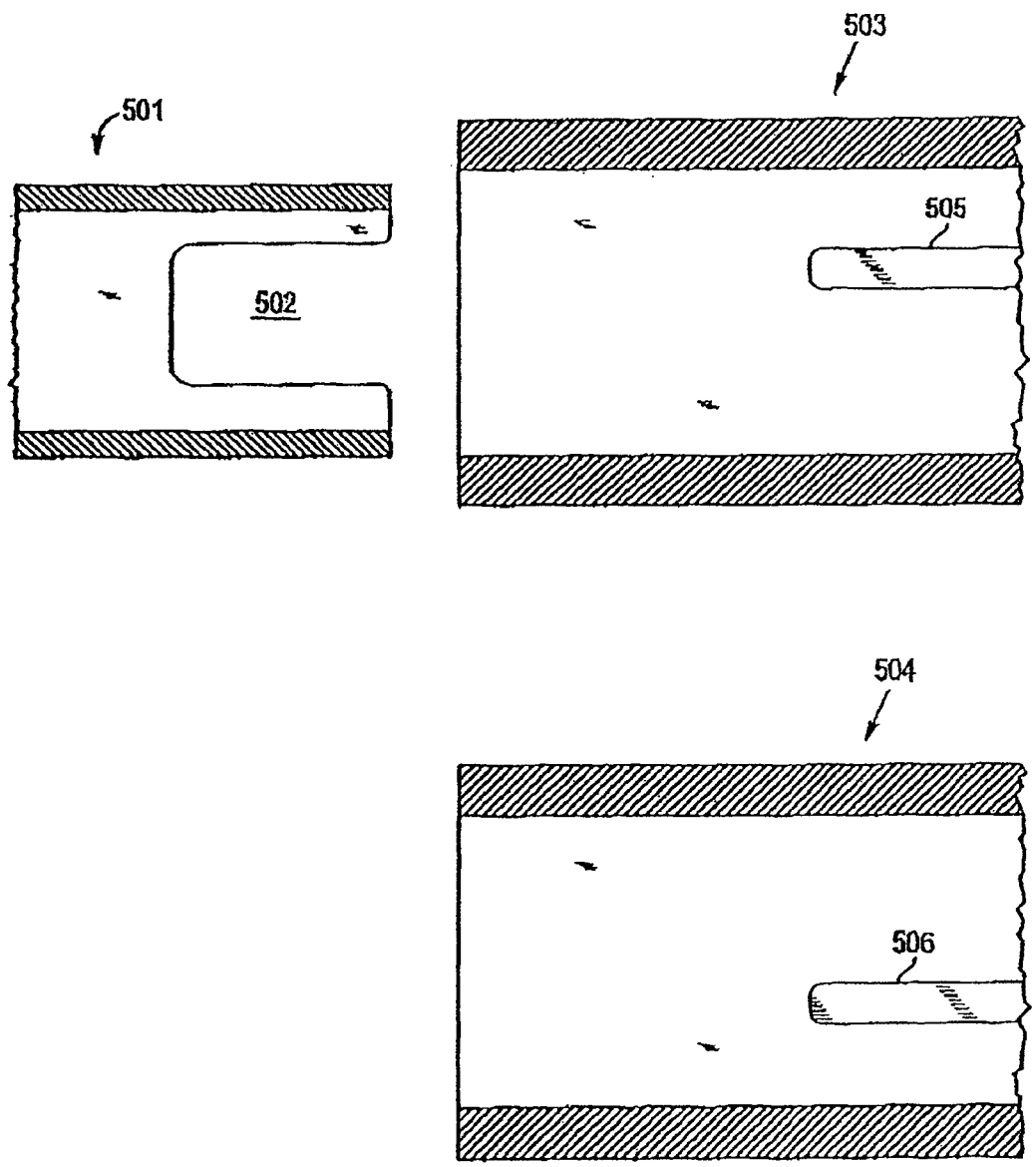
FIG. 5 shows a plug having a slot configuration capable of mating with jacks having keys in different positions.

The position of the key 104 on the tub 102 and the slot 103 on the plug 101 can be varied in such a manner so that a plurality of mutually-exclusive slot and key positions are formed. In one embodiment, the series of key and slot locations are mutually exclusive so that there is a one-to-one correspondence between jacks and plugs. In another embodiment, certain plugs may be configured to mate with a variety of different jacks. For example, it may be worthwhile to give network administers or people with high security clearance certain Amaster@ plugs which are capable of mating with a number of jacks having different slot positions. Referring to the figures, FIG. 5 shows an embodiment of a master plug 501 which has a slot 502 that is configured (which, in this embodiment, means it is wide enough) to mate with jacks 503 and 504 which have different key positions 505 and 506, respectively. Although a wide slot is used in this embodiment to effect mating with two or more jacks having different key configurations, it should be understood that other embodiments are possible, such as, for example a plug with two or more slots.

The number of possible mutually exclusive mating pairs for a given plug and receptacle is a function of the physical parameters of the plug and the receptacle. More specifically, with reference to FIGS. 1-4, mutual exclusivity is ensured by adhering to the following relationships:

$$X1 - C/2 + (D-A) + \Delta <= F/2 \quad (1)$$

$$X2 + B/2 < A/2 - W \quad (2)$$

$$X1a + Clear1 + Z = X1b \quad (3)$$

wherein:
A=the width of the plug 101;
B=the width of the slot 103 on the plug 101;
C=the width of the key 104;
D=the distance across the opening of the tub;
F=the width of the ferrule residing within the plug;
$\Delta$=CLF−CLA, wherein
   CLA=centerline of the width of the plug; and
   CLF=centerline of the ferrule residing within the plug.
X1=the distance from the center of the opening in the tub 102 to the center of the key 104 for each mutually exclusive position.
X2=the distance from the center of the plug 101 to the center of the slot 103 for each mutually exclusive position;
X1a=the X1 distance for a sequentially first key in a series of connectors;
X1b=the X1 distance for a sequentially second key in a series of connectors;
W=the wall thickness of the plug housing
Z=the minimum distance required to ensure that the flat portion of the key does not contact the flat portion of the plug 107 when a user attempts to mate a mating pair;
Clear1=the clearance distance between the center side of the key and the center side of the slot.

These relationships must be satisfied for the mating pairs to mate and for the non-mating pairs to definitely not mate. Specifically, for a mating pair, Relationship (1) requires that half the ferrule width must be no less than $X_1$ less one half of C added to the difference between the width of the tub opening D less the width of the plug added to the difference between the centerline of the ferrule within the plug and the centerline of the plug. This ensures that the key is not positioned outside of the area on which at least a portion of the ferrule will reside. By adhering to this parameter, the key will have some overlap with the ferrule, and thus will provide for pre-alignment of the ferrule in the same manner as do the ribs on the three sides of the ferrule without the key.

Relationship (2) requires that $X_2$ added to one-half of dimension B is less than one-half of dimension A less W. This assures that the slot resides on the plug within the confines of the plug walls.

Finally, according to Relationship (3), for each mutually exclusive position, the distance $X_1$ for the first connector in the system ($X_{1a}$) added to $Clear_1$ added to a predefined interference interval Z would correspond to the distance $X_1$ for the next slot/key position ($X_{1b}$) Z is the minimum distance required to ensure that the flat portion of the key does not contact the flat portion of the plug 107 when a user attempts to mate the two portions of a connector which is intended to mate.

By way of example, four mutually exclusive locations for locating the slot on the plug housing and the key on the tub are defined below for an MT-RJ connector. The MT-RJ connector has the following dimensions:

A=7.15 ±0.05 mm
B=1.25 mm
C=0.95 ±0.04 mm
D=7.24±0.04 mm
F=4.5 ±0.04 mm
Clear1=0.15 mm
W=0.8 mm Based on these MT-RJ dimensions, it has been found that the following $X_1$ key positions satisfy the relationships above:

| Mating pair | Key Position | X₁ |
| --- | --- | --- |
| 1 | 1 | 0.8 mm |
| 2 | 2 | 1.6 mm |
| 3 | 3 | −0.8 mm |
| 4 | 4 | −1.6 mm |

Figure 3:
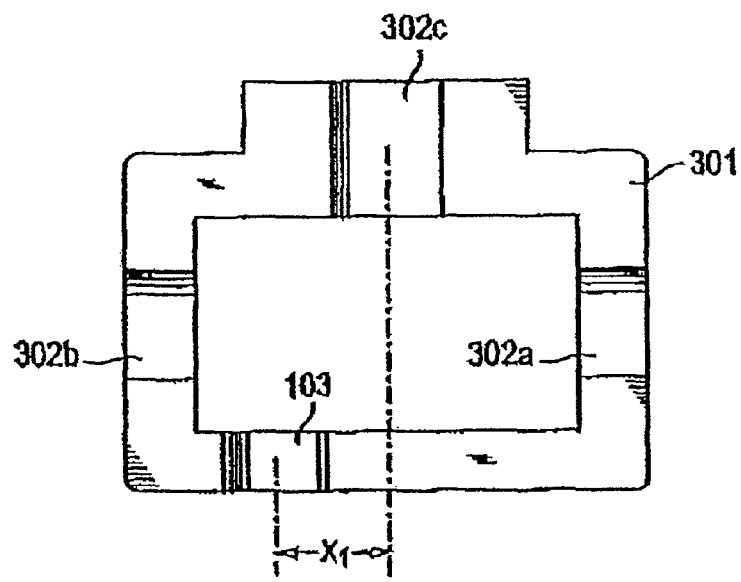
FIG. 3 shows an end view of a first plug showing a first keying element a slot in a first position to accept a second keying element (a key) of a first mating receptacle as shown in FIG. 4.
Figure 4:
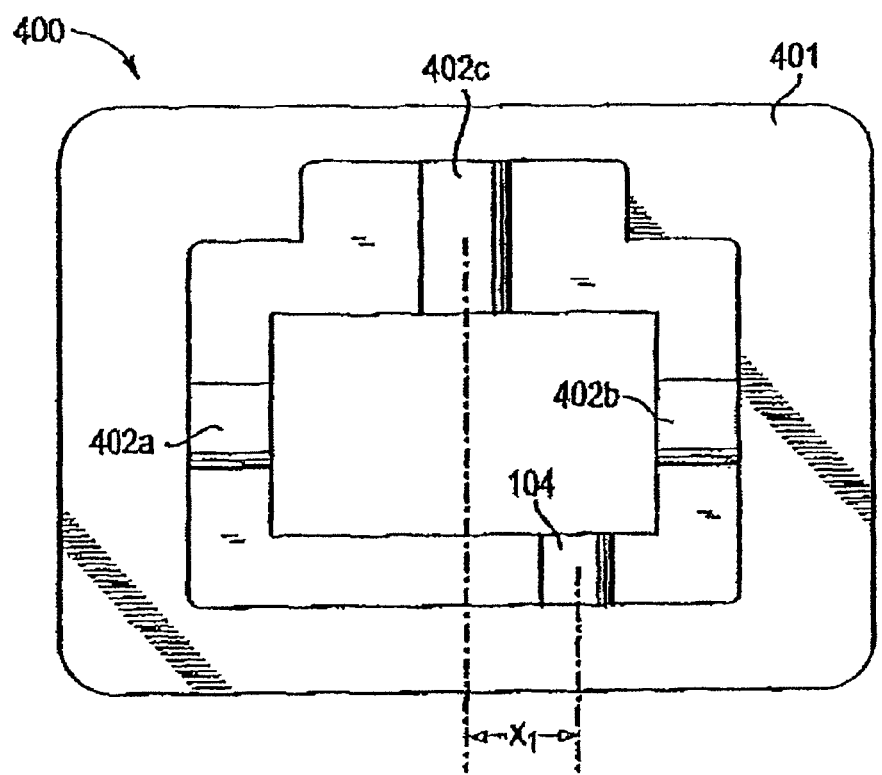
FIG. 4 shows an end view of the first receptacle having a second keying element (a key) in a first position to accept a first keying element of the first plug shown in FIG. 3 to form a first mating pair.
Figure 3A:
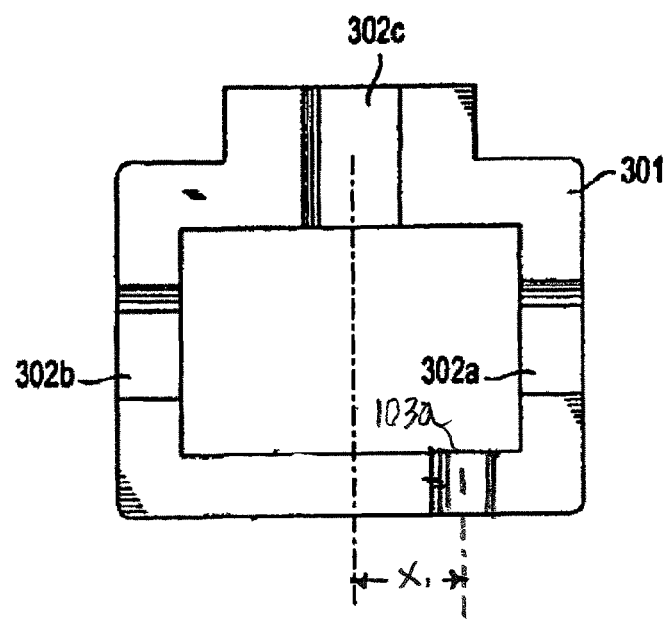
Figure 4A:
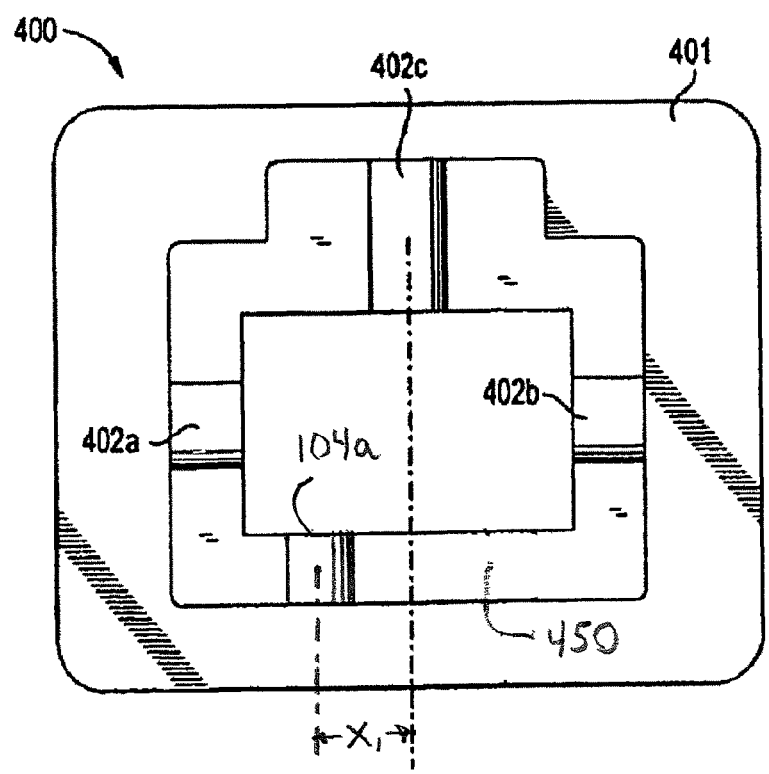
FIG. 4a shows and end view of the second receptacle having a second keying element (a key) in a second position to accept a first keying element of the second plug in FIG. 3a to form a second mating pair.

For example, FIG. 3 shows and end view of a first plug housing 301 showing a first keying element 103 (a slot) in a first $X_1$ position to accept a second keying element 104 (a key) of a first receptacle housing 401 as shown in FIG. 4. FIG. 4 shows an end view of the first receptacle housing 401 having a ferrule-receiving portion having a second keying element 104 (a key) in a first $X_1$ position to accept a fist keying element 103 of the first plug housing 103 shown in FIG. 3 to form a first mating pair. FIG. 3A shows an end view of second plug housing 301a with a first keying element 103a (a slot) in a second $X_1$ position which accepts a second keying element 104a (a key) of a second receptacle housing 401a as shown in FIG. 4A. FIG. 4A shows an end view of the second receptacle housing 401 having ferrule-receiving portion 450 having a second keying element 104a (a key) in a second $X_1$ position to accept a first keying element 103a of the second plug housing 301a shown in FIG. 3A to form a second mating pair.

Although the data above indicates four mutually exclusive positions, it should be understood that additional positions are possible within the parameters of the MT-RJ connector. Additionally, it should be understood that the combinations of various key positions can be used to increase the number of permutations of mating pairs. For example, in addition to the four mating pairs listed above, additional mating pair configurations may obtained from the following combinations of key positions:

| Mating pair | Key Positions |
| --- | --- |
| 5 | 1, 2 |
| 6 | 1, 2, 3 |
| 7 | 1, 2, 3, 4 |
| 8 | 2, 3 |
| 9 | 2, 4 |
| 10 | 2, 3, 4 |
| 11 | 3, 4 |
| 12 | 1, 3 |
| 13 | 1, 4 |
| 14 | 1, 3, 4 |
| 15 | 1, 2, 4 |

Figure 6A:
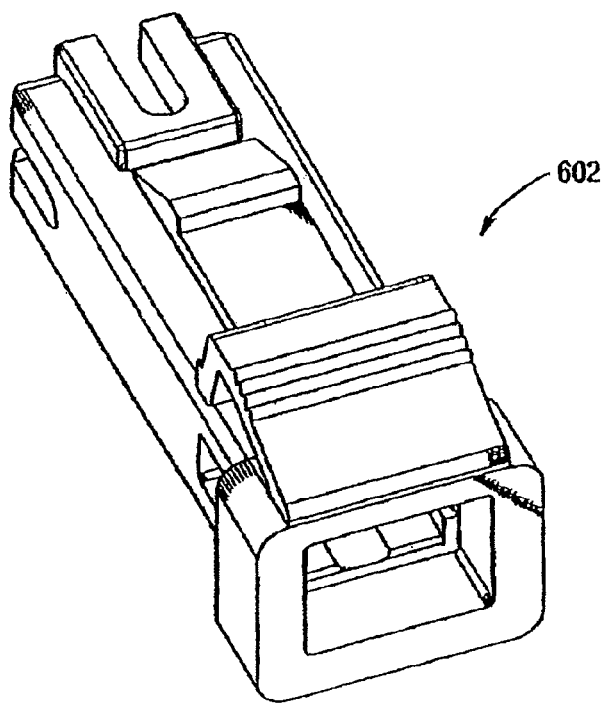
FIGS. 6(a)-6(c) show top perspective, front and rear views, respectively, of an MT-RJ connector plug having security features of the present invention.
Figure 6B:
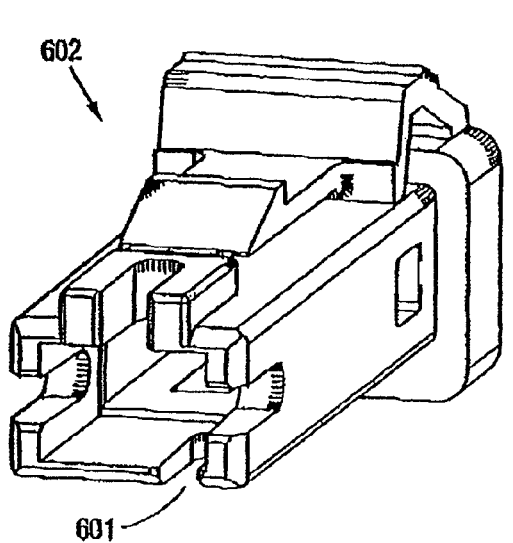
Figure 6C:
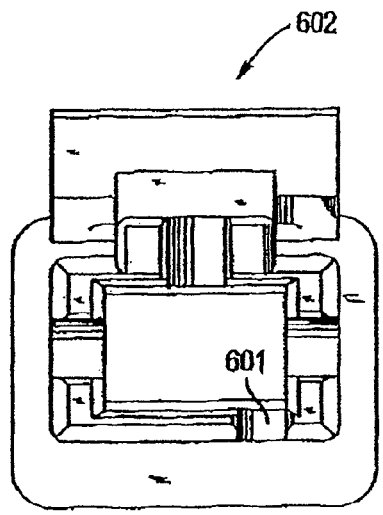

In a preferred embodiment, the key and slot components are combined with the industry standard MT-RJ connector. FIG. 6 and FIG. 7 show the key-slot combination added to the MT-RJ connector as produced by Tyco Electronics of Harrisburg, Pa.

Figure 7A:
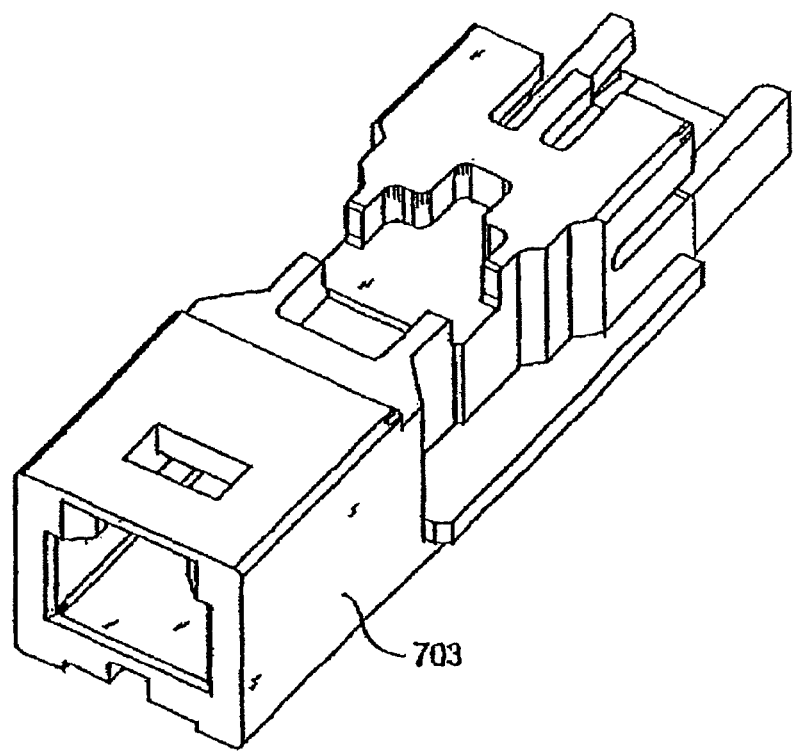
FIGS. 7(a) and 7(b) show top perspective and front views, respectively, of an MT-RJ connector receptacle.
Figure 7B:
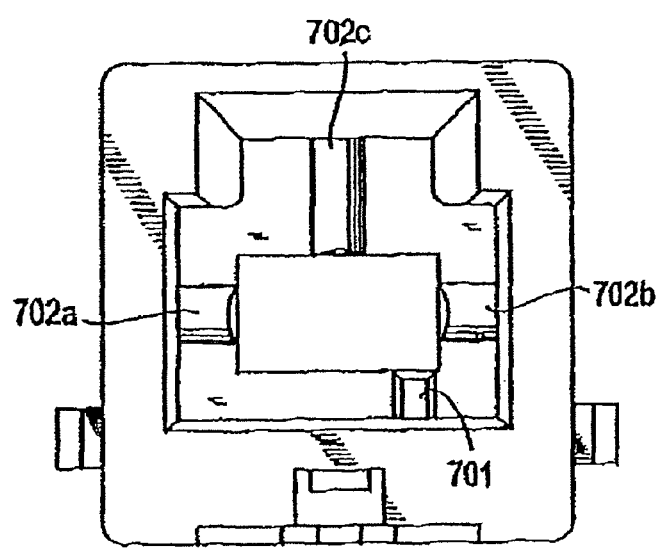

FIGS. 6 (a)-(c) show the plug 602 of the MT-RJ connector combined with the slot 601 of the present invention. FIGS. 7(a) and 7(b) show the center tub portion 703 of an MT-RJ connector jack. The key is shown as 701 located in one of the plurality of possible positions. The three pre-alignment ribs are shown as 702a, 702b, and 702c. The key 701 functions as the discriminating member for allowing or preventing mating with a plurality of plugs, while at the same time functioning as the pre-alignment member for the remaining side of the ferrule not aligned with ribs 702a, 702b, and 702c.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

Figure 8:
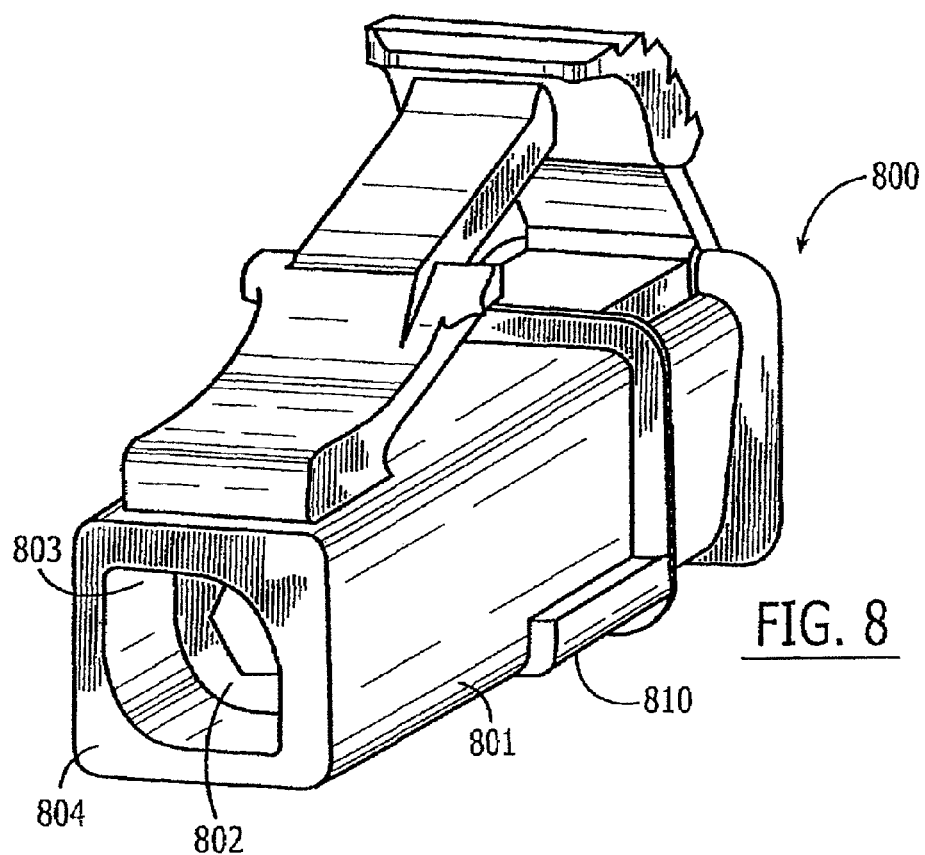
FIG. 8 shows a front and side perspective view of an LC connector plug having security features of the present invention.
Figure 9:
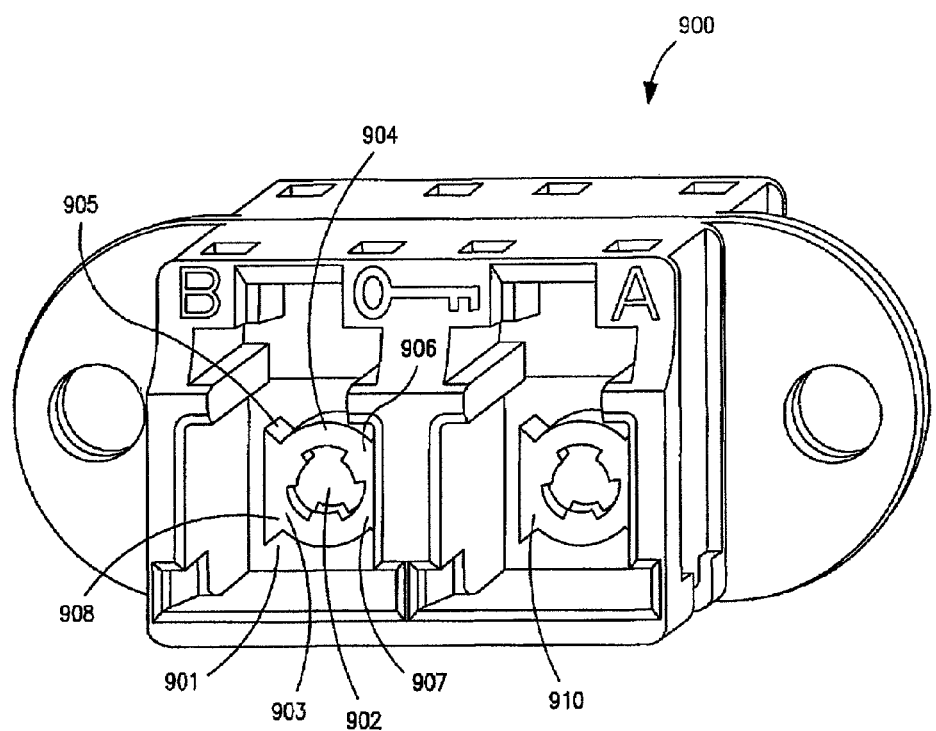
FIG. 9 shows a front perspective view of an LC connector receptacle having security features of the present invention.

Referring to FIGS. 8 & 9, another embodiment of the connector system of the present invention is shown. FIG. 8 shows a plug 800, which is one of a set of different plugs in the system. Each plug has a housing 801 which defines a first geometry. The first geometry comprises a front face 804 with an opening 802 (demarcated with dotted line), and a ferrule (not shown) within said housing and disposed in said opening. Around said opening 802 is a first keying element 803. The keying element for each different optical plug of said set of optical plugs is different.

FIG. 9 shows a receptacle 900 for receiving a particular plug (not shown) and is one of a set of different receptacles. The receptacle 900 has a second geometry configured to receive the first geometry of a plug. The second geometry comprises a cavity 901 to receive a plug and a ferrule-receiving portion 904 having a borehole 902 to receive the ferrule of the plug.

The ferrule-receiving portion 904 defines a second keying element 903 to cooperate with a first keying element of a particular plug. The second keying element for each receptacle of said set of said optical receptacles is different and is adapted to cooperate with one and only one first keying element. Plugs and receptacles having keying elements that cooperate are referred to herein as "mating pairs."

Although the LC connector system described above is a single-fiber ferrule rather than a multifiber ferrule, the general keying features are essentially the same as those described above with respect to the MT-RJ connector. Further, the keying features of the plug 800 and receptacle 900 of the present invention may be implemented in any well known optical connector including, for example, other single-fiber ferrule connectors such as MU, SC, ST, or FC connectors. For illustrative purposes, the security features are described with respect to the LC connector system, which includes the LC plug (plug 800) and LC adapter (receptacle 900). Aside from the security features described herein, these connector components are the same as those specified in the LC Standard available on-line or from OFS (Japan), and the common features between them will not be addressed herein.

Like the MT-RJ embodiment described above, the keying features of the LC connector are contained on the front face of the plug. This is important for a number of reasons. First, these features can be molded with a relatively small change to the mold dies. Specifically, the opening around the ferrule is typically defined in the molding process by a core pin which is inserted into the outer mold. Changing core pin configurations is a relatively inexpensive and easy step compared to altering the configuration of the outer molds. Therefore, as mentioned above, the connector system of the present invention provides for a variety of different plug configurations with only slight modifications to the molding process.

Having the security features on the front face of the plug also provides for an early indication of non-matability. Specifically, since the features are located on essentially the leading edge of the plug, they are positioned optimally to "stub" as soon as possible when a plug is inserted into a non-mating receptacle. The applicants recognize that interference between connector components which are non-mating should be made as soon as possible to minimize the possibility of coupling light between connectors. That is, if close enough, optical connectors are able to couple, albeit with high loss, even if the connectors are not mechanically engaged. This condition can be meliorated by preventing the light carrying elements from getting too close—hence the desire to stub early. Stubbing early also provides an early signal to the user that the plug is non-mating and avoids the tendency of trying to force a plug into a non-mating receptacle.

Additionally, by locating the keying feature on the leading surface of the plug, the corresponding keying feature on the receptacle may be located internally and still provide an early indication of non-matability. This is beneficial since it is desirable to locate the keying feature of the receptacle internally to minimize the ability of the keying feature to be tampered with or otherwise overridden. As discussed below, this is of particular importance in the configuration of the MT-RJ and LC connectors in which the plug defines the slot and the receptacle defines the key. If the key is removed, the security feature is breached. Having the key located within the receptacle reduces this risk.

Yet another benefit of having the keying features located on the front face of the plug is the visual indication the plug provides with respect to its keying features. That is, one can readily determine the keying configuration of the plug by visual inspection of its front face. There is no need to look into an opening to inspect the internal geometry of the plug to determine its keying configuration.

The keying elements that may be used in the LC connector are the same as those described above with respect to the MT-RJ embodiment. In a preferred embodiment, the keying elements comprise a slot and a key. The slot can be embodied in the first or second geometry and the key can be embodied in the other geometry. In a first configuration, the slot is embodied in the first geometry and the key is embodied in the second geometry, while in a second configuration, the key is embodied in the first geometry and the slot is embodied in the second geometry.

The LC connector shown in FIGS. 8-9 has a first configuration. This configuration is advantageous for a number of reasons. First, the first keying features do not prevent a plug from mating with an ordinary receptacle. This is particularly beneficial since a plug with keying elements can be nevertheless "mated" with standard equipment used for the polishing, testing and inspection of the ferrule. Specifically, the polishing, testing and inspection equipment for single fiber ferrules typically comprises a ferrule receiving interface, similar to that of a receptacle, which receives just the ferrule disposed in the opening of the housing. The housing is not engaged. If a key protrudes into the space between the opening and the ferrule, it would preclude coupling with this existing equipment. Conversely, by having slots extend radially outward from the opening, and thereby maintain the space between the opening and the ferrule, a standard ferrule receiving interface, which does not have keying features, can be used. For example, a plug having a first keying element can be coupled to a standard LC ferrule receiving interface connected to a polishing device for polishing the ferrule, or to a microscope for inspecting the endface geometry of the ferrule, or to a photodetector for testing optical attenuation of the ferrule assembly.

Furthermore, since the physical "barrier"—i.e., the key—is located on the receptacle in the first configuration, it will serve to facilitate discriminatory mating among, not only plugs employing security features, but also existing plugs which have no security features of the present invention. Specifically, if a slot in the plug is necessary to accommodate the key of the receptacle, then plugs without slots will not mate with receptacles having the key. Therefore, ordinary, non-secure type plugs which do not have the slot in the proper position will not mate with the receptacle. In contrast, a non-secure receptacle will mate with a secure plug of the first configuration. Specifically, since the physical barrier is absent from the receptacle, any ordinary or secure plug can mate with it. As discussed below, the situation with the second configuration is opposite from that of the first, meaning that a secure plug cannot mate with a non-secure receptacle but a secure receptacle can mate with a non-secure plug. To provide for discrimination between secure and non-secure connectors components, a secondary key is added to the system as discussed below.

A connector system having the second configuration offers certain benefits, but also presents certain challenges. One benefit is that the space consuming security feature—i.e., the slot—resides in the receptacle which is typically larger than the plug and better suited for accommodating this feature. That is, since a slot is defined by the material around it, a slot requires more room than a key. The receptacle does not have the same space constraints as a plug (which is designed to be inserted in the receptacle) and may be more capable of accommodating the slot than the plug. Additionally, it may be preferable to have one "master" plug which plugs into all receptacles having security features. This is easily accomplished with a connector system of the second configuration. Specifically, the master plug would simply be one having no key to interfere with the first geometry of the receptacle. The simplicity in offering a master plug in the connector system of the second configuration also gives rise to a challenge facing the system—the ability of non-secure plugs to mate with secure receptacles (discussed below).

Figure 10:
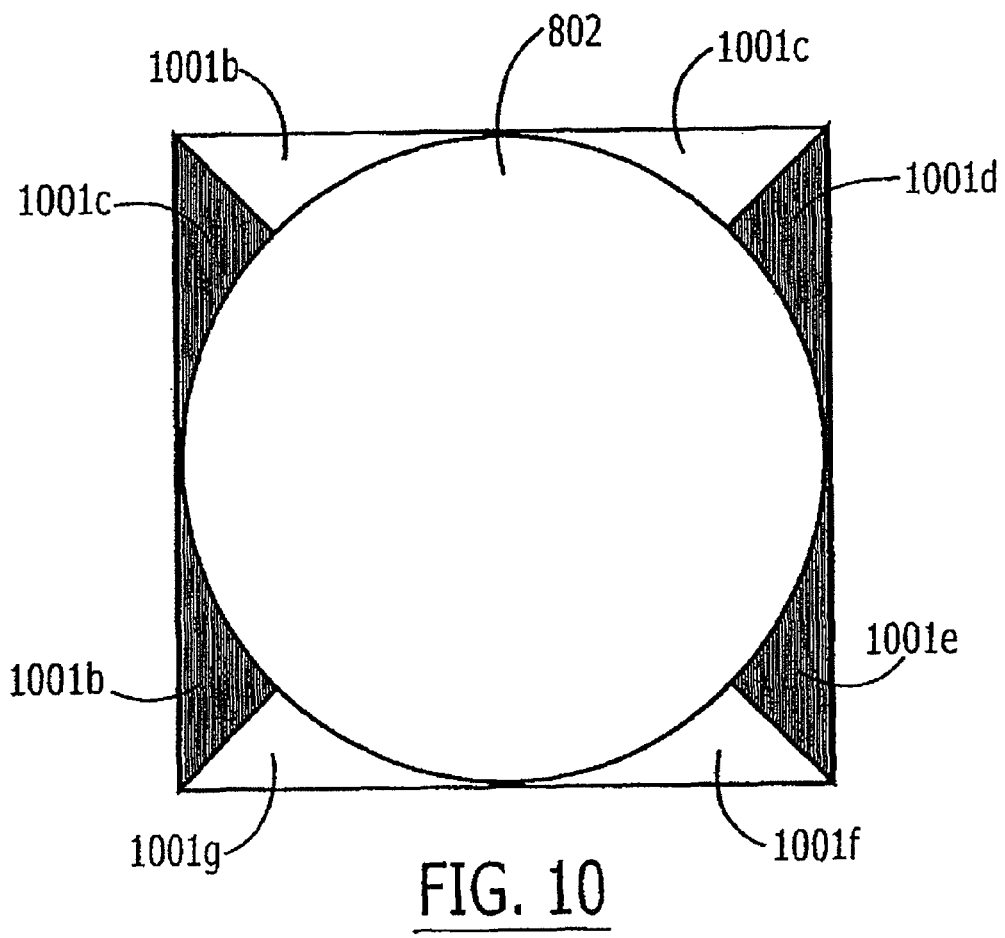
FIG. 10 shows schematically the discrete positions available for the first keying element.

Referring to FIG. 10, a preferred embodiment of the first keying element 803 is shown schematically. The figure shows the opening 802 in which the ferrule is disposed and which is configured to receive the ferrule-receiving portion 904. Positioned around the opening 802 are spatially discrete positions 101(a)-(h) for the first keying element. Similar discrete positions exist around the ferrule-receiving portion 904 (see FIG. 9) to define the location of the second keying element. In a preferred embodiment, the first keying element comprises one or more slots in a combination of positions 101(a)-(h) and the second keying element comprises keys in corresponding positions. It should be understood that to facilitate cooperation between the first and second keying elements, the combination of slot positions in the plug must be the same as the combination of key positions in the ferrule receiving portion 904. In other words, each slot must correspond to a key in the same relative position to facilitate a mating pair. For example, a plug having a first keying element which comprises slots in positions 1001a, 1001d, 1001e, and 1001d, will mate with a receptacle having a second keying element comprising keys 905, 906, 907, and 908 is the same relative positions (see FIG. 9).

The number of slots in the combination of first keying elements depends upon the number of possible positions of the slots. Specifically, the number of possible permeations of different mating pairs is given by the following equation:

$$nCr = \frac{n!}{r! \cdot (n-r)!}$$

wherein:
n equals the number of spatially discrete positions for the keying elements, and
r is the number of positions occupied.
$_nC_r$ therefore provides for the number of mutually exclusive combinations or permeations of mating pairs.

Below is a table providing data on the theoretical number of mating pairs, $_nC_r$, for different n and r values.

| Number of Spatially Discrete Positions n | Number of Positions Occupied r | Number of Mutually Exclusive Combinations $_nC_r$ |
|---|---|---|
| 4 | 1 | 4 |
|   | 2 | 6 |
|   | 3 | 4 |
|   | 4 | 1 |
| 5 | 1 | 5 |
|   | 2 | 10 |
|   | 3 | 10 |
|   | 4 | 5 |
|   | 5 | 1 |
| 6 | 1 | 6 |
|   | 2 | 15 |
|   | 3 | 20 |
|   | 4 | 15 |
|   | 5 | 6 |
|   | 6 | 1 |

From this data, it is clear that the maximum number of permutations (i.e., $_nC_r$) is reached when the number of positions occupied equals n divided by 2. Therefore, in the preferred embodiment, either n/2 slots (if n is an even integer) or (n±1)/2 slots (if n is an odd integer) of spatially discrete positions are occupied by either a slot with respect to the plug or a key with respect to the receptacle. (For purposes of simplicity, hereinafter, n will be presumed to be an even number.) Therefore, using the equation above, the embodiment shown in FIGS. 8, 9 and 10, in which n equals 8 and r equals 4, the maximum number of permutations of mating pairs is 70.

Figure 11:
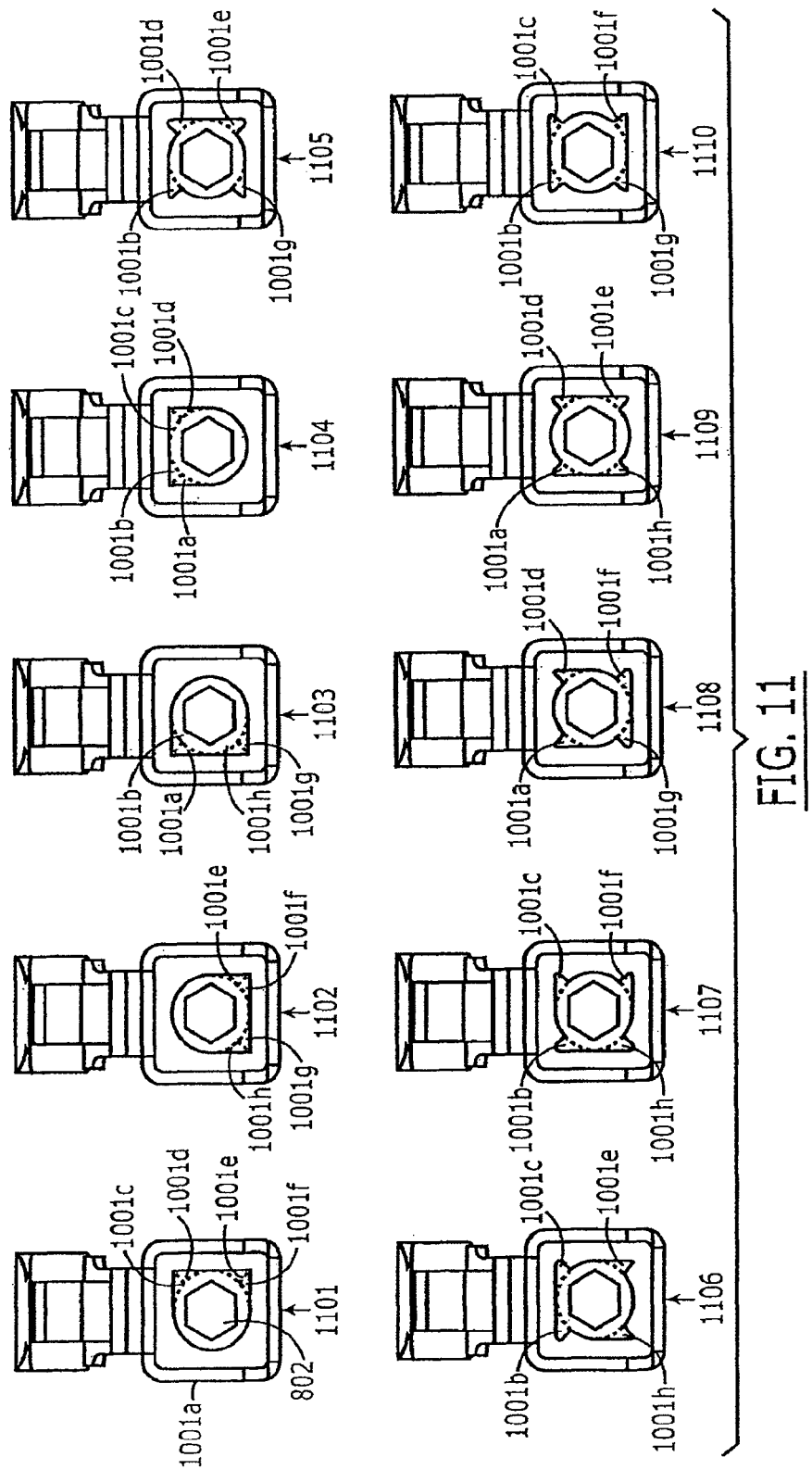
FIG. 11 shows a series of LC connector plugs in which the first geometries are different.
Figure 12:
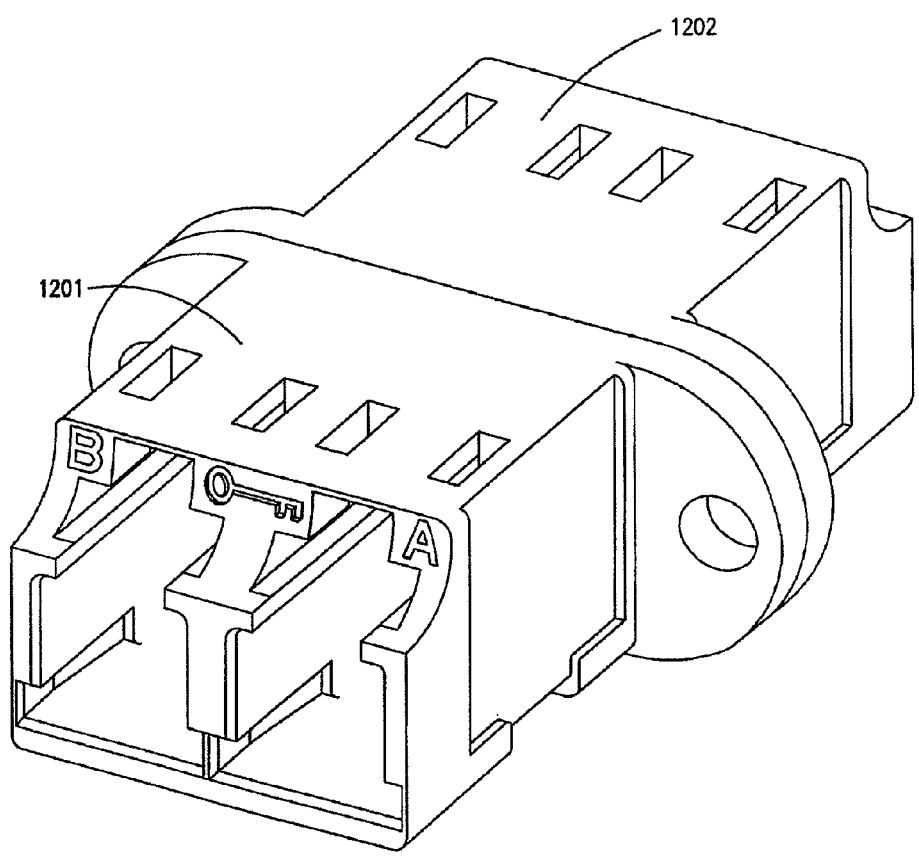
FIG. 12 shows a hybrid adapter.

Referring to FIG. 11, different of plugs 1101-1110 of a set are shown in which the first keying elements comprise slots in different combinations of positions as defined in FIG. 10 and accompanying text. In these drawings, the opening 802 which is constant in all the plugs and the slot positions are shown with a phantom line. Specifically, plug 1101 shows slots in a combination of positions 1001c, 1001d, 1001e, and 1001f; plug 1102 shows slots in a combination of positions 1001e, 1001f, 1001g, and 1001h; plug 1103 shows slots in a combination of positions 1001a, 1001b, 1001g, and 1001h; plug 1104 shows slots in a combination of positions 1001a, 1001b, 1001c, and 1001d; plug 1105 shows slots in a combination of positions 1001b, 1001d, 1001e, and 1001g; plug 1106 shows slots in a combination of positions 1001b, 1001c, 1001e, and 1001h; plug 1107 shows slots in a combination of positions 1001a, 1001c, 1001f, and 1001h; plug 1108 shows slots in a combination of positions 1001a, 1001d, 1001f, and 1001g; plug 1109 shows slots in a combination of positions 1001a, 1001d, 1001e, and 1001h; and plug 1110 shows slots in a combination of positions 1001b, 1001c, 1001f, and 1001g. It should be understood that each of the plugs described above will mate with a receptacle having a key in the same position. For example, plug 1109 will mate with receptacle 900 which has keys 904, 905, 906 and 907 in the same positions as the slots (i.e., 1001a, 1001d, 1001e, and 1001h).

In a preferred embodiment, the connector system of the present invention may contain one or more master plugs of varying levels. That is, there may be lower-level master plugs, which can mate with receptacles of two different networks, or higher-level master plugs, which can mate with receptacles of three or more networks. The difference in the level of the mater plug is a function of the r number of slots occupying n possible positions—the more slots there are, the higher the plug's level. Specifically, the master plug comprises a first keying element having a third combination of greater than n/2 slots, in which the slots occupy the positions of at least two different first combinations as described above. Higher level master plugs have slots which occupy the positions of three or more different first combinations.

Aside from showing the different combinations of keying elements, FIG. 11 illustrates the ease with which the various plugs can be made. Specifically, in a preferred embodiment, the process of manufacturing an optical connector comprises molding different plugs by adjusting the core pin which defines the opening 802 while leaving the outer molds essentially the same. In other words, rather than using different molds to modify the outside of the housing—which can be expensive, the present invention involves simply adjusting the core pin—which is relatively inexpensive. Referring to FIG. 11, the process is described in greater detail. The process comprises first molding a first housing 1101a for a first plug 1101 of a set of plugs 1101-1110 using a core pin (not shown) to define an opening 802 and a first keying element in a first combination of positions 1001c, 1001d, 1001e, and 1001f. Next, a second housing 1102a for a second plug 1102 is molded by adjusting only said core pin to define first keying element in a second combination of positions 1001e, 1101f, 1001g, and 1101h, which is different from first combination of positions.

To effect the different combinations of positions, the core pin is preferably adjusted by rotating it in θ increments, in which θ is equal to 360°/m, wherein m is an integer. Preferably m is an integer from 2-18, more preferably from 2-5, and even more preferably from 3-4. In the embodiment shown in FIG. 10, m is 4, thus the core pin is adjusted by rotating it in 90° increments. It should be clear that rotating this core pin in 90° increments in subsequent molding operations will produce plugs 1103 and 1104, respectively. Plugs 1105-1108 were prepared using a different core pin which was also rotated in 90° increments. Plugs 1109 and 1110 were prepared using yet a different core pin which was rotated in a 90° increment. It is worthwhile to mention that since the combination of positions 1001b, 1001c, 1001f, and 1001g is symmetrical with respect to two axes, the core pin can only be rotated by one 90° increment before repeating the same combination of positions.

Once the housings are prepared, a ferrule is disposed in the opening of each housing to form a subassembly. A fiber may be terminated in the ferrule either before or after the preparation of the subassembly. For field-terminatable connectors, it may be preferable to dispose just a fiber stub in the ferrule. This configuration facilitates field installation of a fiber as discussed, for example, in WO2005004285. Regardless of whether a stub or a fiber is terminated in the ferrule, the preferred keying arrangement of the present invention in which slots radiate outwardly from the opening 802 allows the subassembly of the LC connector to be polished, inspected, and tested using standard polishing equipment as mentioned above.

An advantage of the connector system of the present invention is that different receptacles may be combined to form "hybrid" adapters. More specifically, aside from the second keying element extending outward from the ferrule receiving portion, the receptacles are the same as those used for standard connectors. This allows different receptacles to be combined back to back to form hybrid adapters. In a particularly preferred embodiment, a secure receptacle is combined with a nonsecure receptacle by ultrasonically welding, or other known technique. Such a configuration is particularly useful in situations in which the nonsecure end of the adapter is located in an inherently secure area, for example, behind a wall or panel, where access is already limited. In other words, since connectors within cabinets and walls cannot be accessed readily after construction, the advantages derived from a secure connector at those ends would be minimal. Thus, it is preferable to use a nonsecure connector in these situations so the installer need not concern himself with the "proper" secure connector configuration during the installation of the infrastructure wiring.

To discriminate between secure and non-secure connector systems, the present invention provides for a secondary key & slot configuration, which is either non-existent or in a different position for all plugs and receptacles which are outside of the given connector system 800. For example, referring to FIG. 8, the first geometry comprises a secondary plug 810, which is shown in the same relative position for all plugs of a given set, but which may be in different positions as discussed below. Referring to FIG. 9, the second geometry of the geometry of the receptacle comprises a secondary slot 910 are preferably, but not necessarily, in the same position for all the receptacles of a given set of receptacles. The secondary slots 910 are adapted to receive secondary keys 810. This way, only plugs and receptacles of a given set of having accommodating secondary keys/slots will mate. In a preferred embodiment, at least a portion of the secondary key 810 is disposed in the plug and is an extension of the side loading structure which is an LC connector standard. Therefore, in the preferred embodiment, the secondary key not only provides for discriminating mating between secure and non-secure connectors, but also enhances side load strength.

It is worthwhile to note that the use of the secondary key/slot adds another security feature to the connector system—essentially another keying mechanism. This additional keying feature increases the number of permutations within a given connector system. That is, rather than maintaining the same secondary key and slot location for all connectors within a system, it can be moved to form different classes within the same family Preferably, the keying elements (primary and secondary) are positioned such that not mating pairs "stub" at about the same axial position relative to one another regardless of whether the connectors are interfering because they are different types of secure connectors or whether they are interfering because they are secure/non-secure connectors. This way, the user becomes accustomed to the point at which non-mating connector components interfere, thereby reducing the risk of the user forcing non-mating components together.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

Considering, for example, routers/backplane assemblies, the connector system of the present invention can be used to organize switch racks and, more specifically, to manage patch cables to reduce clutter and improve the ease, reliability, and security of the patch cable installation by providing customer specific patch cables/backplane connections.

By way of background, although network architectures may vary, common to most networks, and of particular interest herein, are switch rack systems. Such systems involve multiple-port switches mounted in a rack. Each activated port of a switch is connected to an aggregation box in the panel with a patch cable. The aggregation box, in turn, is connected to a deaggregation or breakout box with a trunk cable. The breakout box breaks out the trunk into individual channels again. The interconnections between the ports and the aggregation box and between the aggregation and breakout boxes may be accomplished using optical fiber or electrical conductor.

One of the objectives in designing switch racks is to minimize floor space. To this end, efforts are generally concentrated on increasing port density. This means increasing the number of ports on a particular switch and increasing the number of switches that fit into a particular rack or panel. A challenge in designing and installing such high port density switch racks is organizing the patch cables interconnecting the ports to the aggregator. Each activated port requires a discrete connection to the aggregator. This can lead to a great quantity of patch cables and general clutter, which creates a strong likelihood that a patch cable will be connected to the wrong port in error. Even trained technicians find it difficult to work around such clutter effectively and without making errors. If a patch cable is in fact connected to the wrong port, it may take hours to troubleshoot and resolve the problem in the mass of interconnections. Therefore, a need exists for a switch rack system that reduces the likelihood of improper interconnections.

The connector system of the present system fulfills this need among others. Specifically, the patch cables may be configured with one or more particular secure connectors to ensure that the correct plug is plugged into the correct receptacle. In one embodiment, the interconnections are not only secure, but customized for a particular user. Specifically, Applicants recognize that many of the interconnections involve multi-connector assemblies such as duplex and quad connectors. Applicants also realized that the multi-connector assemblies provide an opportunity to increase the number of permutations of the secure connectors to the extent that particular duplex and quad connector assemblies can be provided on a per customer basis.

Figure 13A:
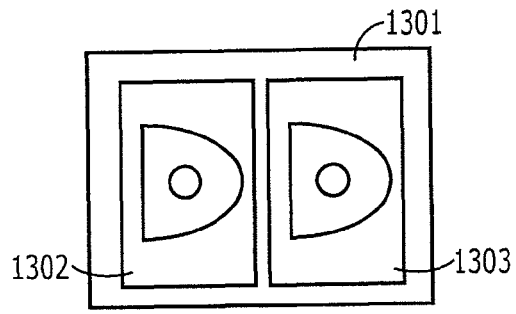
FIGS. 13(a) and (b) show duplex and quad connectors having receptacles with the same security features.
Figure 13B:
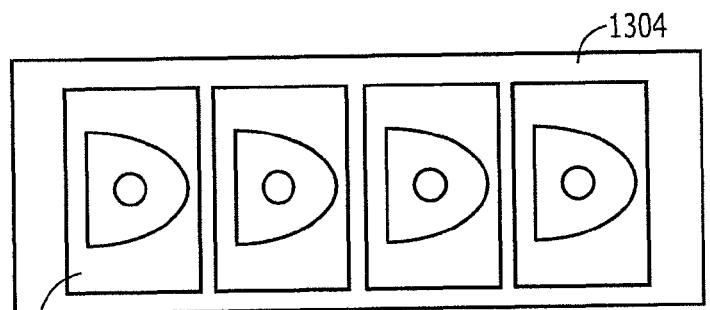

By way of background, referring to FIGS. 13(*a*) and 13(*b*), one embodiment of the invention is shown as a duplex and quad connectors having the same secure configuration for each connector. Specifically, the duplex connector 1301 has to two identical receptacles 1302, 1303, each having the same D-type configuration. (It should be apparent that this receptacle configuration corresponds to the plug 1101 shown in FIG. 11) Likewise, the quad connector 1304 shown in FIG. 13(*b*), comprises four identical receptacles 1305. (Again each receptacle corresponds to the plug 1101 shown in FIG. 11.)

Although the connector embodiments of FIGS. 13(*a*) & (*b*) work well to ensure a secure connection, they are limited in the number of unique configurations they can make. Specifically, referring to FIG. 13(*a*), the duplex connector 1301 with identical receptacles 1302 and 1303 only has four unique combinations using the primary tooling. Likewise, the quad receptacle 1304 shown in FIG. 13(*b*) is also limited to just four unique combinations using primary tooling. As used herein, the primary tooling refers to the tooling required to make embodiments 1101-1104 as shown in FIG. 11(*b*). As mentioned above, one of the advantages of the connector system shown in FIG. 11, is the ability to provide different receptacle and plug configurations simply by rotating the core pin. In other words, different configurations can be manufactured using the same tooling. This is desirable from a production cost standpoint.

Although the number of permutations of the quad shown in FIG. 13(*b*) could be increased to forty (40) by using the ten (10) alternative configurations keying configuration illustrated in plugs 1101-1110 in FIG. 11, this requires additional tooling because plugs 1105-1110 cannot be produced by rotating the core pin used in the manufacture of plugs 1101-1104.

Figure 14A:
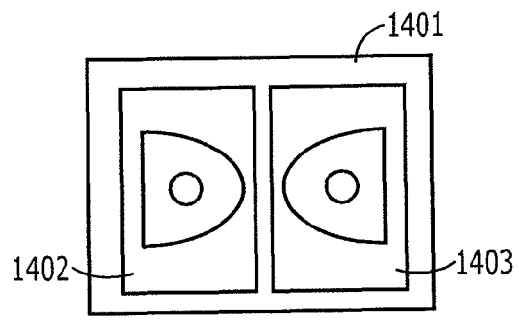
FIGS. 14(a) and (b) show duplex and quad connectors having receptacles with different security features.

In addition to a desire to avoid additional tooling requirements, Applicants have identified a need to further increase the number of unique connector combinations so that certain multi-connector configurations can be customized for a particular user. To this end, Applicants disclose herein multi-connector assembly in which two or more of the geometries of the connectors of a given assembly are different. For example, one embodiment of the duplex connector 1401 of the present invention is shown in FIG. 14(*a*). In this embodiment, the duplex connector 1401 comprises one receptacle 1402 having a geometry similar to the receptacles shown in FIG. 13A, but its second receptacle 1403 has a different geometry, corresponding to the plug 1103 shown in FIG. 11. By configuring the duplex connector 1401 such that at least two of the receptacles have different first geometries, the number of unique combinations increases from four to sixteen.

Figure 14B:
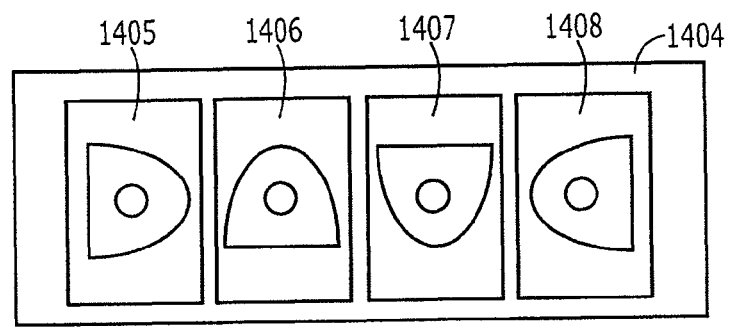

Even more permutations can be derived from the quad connector 1404 as shown in FIG. 14(*b*). Specifically, quad connector 1404 can be arranged such that at least two of the receptacles have different geometries. As shown in FIG. 14B, quad 1404 has four receptacles 1405, 1406, 1407, 1408, all of which have a different geometry. Specifically, 1405 corresponds to plug 1101, receptacle 1406 corresponds to plug 1102, receptacle 1407 corresponds to plug 1104 and receptacle corresponds to plug 1103. It should be understood that while each of these is different, the number of different plug/receptacle geometries can carry from two to four in this assembly. By altering the geometries within the quad connector, the number of unique permutations increases dramatically. For example, just using the primary tooling described above, 256 combinations are possible. When all ten keying combinations are used as shown in FIG. 11, 1600 unique combinations are possible.

In addition to increasing the number of unique connector assemblies, varying the geometry among the connectors of a given assembly also improves the resilience of the connector to a "forced" connection. Specifically, when the geometries are aligned as they are in the connectors of FIGS. 13(*a*) & (*b*), a user can force the connection by biasing the mating connector to one side or the other. For example, if a user wanted to force a connection to the duplex connector 1301 of FIG. 13(*a*), the user could urge the plug assembly to the left of the duplex connector 1301 during mating. However, by varying the geometries as in the embodiment of FIGS. 14(*a*) and (*b*) such that there is no polarization or alignment of the geometries, a user can no longer urge the mating connector to one side or the other to force the connection. Thus, the embodiments of FIG. 14(*a*) and (*b*) are also less prone to forced connections.

It should be understood that specific plug assemblies such as a duplex and quad are not illustrated particularly herein, but that such connectors assemblies are produced by clipping together simplex connectors, such as those shown in FIG. 11, with a known clip (see, for example, U.S. Pat. No. 7,500,790, incorporated herein by reference.)

Because the present invention provides for so many unique combinations, it is possible to designate certain unique configurations for certain customers. In this regard, the color of the connector itself may be used to render it unique for a certain customer. For example, the quad connector embodiment shown in FIG. 14(*b*) may be provided in green for one customer and be provided in blue for a different customer. Thus, the physical connectors themselves may be the same but the colors are different based on the user.

In one embodiment, the housings are color coded as described above. In another embodiment, the connectors comprise strain relief boots extending rearwardly (not shown) that are color coded to increase the number of color permutations possible. Such strain relief boots are well known and are disclosed, for example, in U.S. Pat. No. 7,695,197, incorporated herein by reference.

It should be understood that while the multiple connector configurations were discussed in terms of a patch cords, the application is by no means limited to patch cord applications. Indeed, the unique multi-connector arrangements can be applied in any situation requiring multi-connector connections. In this regard, it should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed:

1. A connector system comprising:
   a set of optical plug housings, each plug housing having a front and back orientation and having a front face defining an opening configured to accommodate the disposition of a ferrule therein, said each plug housing defining a first keying element at least partially on said front face, said first keying element of said each plug housing in said set of optical plugs housings being different;
   a set of optical receptacle housings, each receptacle housing having a front and back orientation and having a first opening to receive a plug housing of said set of optical plug housings, a second opening smaller than said first opening and rearward of said first opening, and a second keying element adjacent said second opening, said second keying element of said each receptacle housing of said set of optical receptacle housings being adapted to cooperate with said first keying element of one and only one plug housing of said set of optical plug housings, wherein said each plug housing and said each receptacle housing having said first and second keying elements that cooperate is a mating pair;
   wherein said first keying element is at a predefined position, said predefined position of said first keying element for said each optical plug housing of said set of optical plug housings being different, and wherein said second keying element is at a predefined position, said predefined position of said second keying element for said each receptacle housing of said set of said optical receptacle housings being different, each said second keying element being positioned and configured to cooperate with one and only one said first keying element; and wherein said each plug housing and said each receptacle housing of said each mating pair is marked with a matching visual identification different from plug housings and receptacle housings having differently positioned first and second keying elements.

2. The connector system of claim 1, wherein on said each receptacle, said second keying element is disposed at the periphery of said second opening.

3. The connector system of claim 2, wherein on said each receptacle, said second opening is defined in a wall and said second keying element extends forward from said wall.

4. The connector system of claim 3, wherein said each first keying element on said each plug housing is a key slot and said each second keying element on said each receptacle housing is a key.

5. The connector system of claim 1, wherein said visual identification being at least one of color or alphanumerical indicia.

6. A connector set of discriminating receptacles and plug housings, said connector set comprising a plurality of different receptacle housings and a plurality of different plug housings for coupling with said different receptacle housings, each different plug housing having a front face with a unique first geometry, said each different receptacle housing having a cavity to receive one of said different plug housings and a wall at the rear of said cavity defining an opening, at least one protrusion being forward of said wall and defining a unique second geometry; wherein each unique first geometry corresponds to one, and only one, said unique second geometry such that said plug and receptacle housings having corresponding unique first and second geometries in said connector set are mating pairs; wherein each mating pair is marked with a matching visual identification different from said plug and receptacle housings having said different first and second geometries in said connector set.

7. The connector set of claim 6, wherein said different receptacle housings and said different plug housings are MT-RJ type connectors.

8. The connector set of claim 6, wherein said unique first geometry is configured to receive one and only one said unique second geometry.

9. The connector set of claim 6, wherein on said each receptacle housing, said at least one protrusion is adjacent said opening.

10. The connector set of claim 9, wherein on said each receptacle housing, said at least one protrusion is disposed at the periphery of said opening.

11. The connector set of claim 10, wherein on said each plug housing, said first unique geometry comprises a first keying element and, on said each receptacle housing, said second unique geometry comprises a second keying element.

12. The connector set of claim 6, wherein said visual identification is at least one of color and alphanumerical indicia.

13. The connector set of claim 12, wherein on said each plug housing, said first keying element is a key slot, and, on said each receptacle housing, said second keying element comprises a key.

14. The connector set of claim 6, wherein on said each receptacle housing, said at least one protrusion is configured to guide a ferrule toward said opening.

15. The connector set of claim 14, wherein on said each receptacle housing, said at least one protrusion comprises a plurality of protrusions.

16. The connector system of claim 6, wherein said unique second geometry of each different receptacle housing is different in that said at least one protrusion is at different positions on the different receptacle housings.

17. A connector system comprising:
a first plug having a front and back orientation and having at least a first plug housing and a first ferrule, said first plug housing having a front face defining an opening and a first geometry, said first ferrule being disposed within said opening;
a first receptacle having a front and back orientation and having at least a first receptacle housing having a first opening capable of receiving said first plug housing and a second opening rearward of said first opening, and at least one protrusion disposed at a periphery of said second opening and extending forward toward said first opening, said at least one protrusion defining a second geometry and being configured for guiding said first ferrule toward said second opening, said first and second geometries being configured to mate;
a second plug having a front and back orientation and having at least a second plug housing and a second ferrule, said second plug housing having a front face defining an opening and a third geometry, said second ferrule being disposed within said opening of said second plug;
a second receptacle having a front and back orientation and having at least a second receptacle housing having a first opening adapted for receiving said second plug housing and a second opening rearward of said first opening, and at least one protrusion disposed at a periphery of said second opening and extending forward toward said first opening of said second receptacle, said at least one protrusion defining a fourth geometry and being configured for guiding said ferrule toward said second opening, said third and fourth geometries being configured to mate;
wherein said first geometry is different than said third geometry such that said first plug cannot mate with said second receptacle and said second plug cannot mate with said first receptacle;
wherein said first plug and said first receptacle are a first mating pair having a first visual identification;
wherein said second plug and said second receptacle are a second mating pair having a second visual identification;
wherein said first visual identification is different than said second visual identification.

18. The connector system of claim 17, wherein on each of said first and second receptacles, said at least one protrusion is configured to guide said ferrule into said second opening.

19. The connector system of claim 18, wherein the difference between said second and fourth geometries is the position of said at least one protrusion.

20. The connector system of claim 19, wherein said first and second visual identification being at least one of color or of alphanumerical indicia.

21. A set of optical plugs for discriminating mating with a set of different optical receptacles, said set of optical plugs comprising: a plurality of different plug housings, each plug housing having a front face having an outer periphery and an inner periphery, said inner periphery defining an opening configured to accommodate the disposition of a ferrule therein, said each plug housing having a first keying element defined on at least one of said front face, said inner-periphery, and said outer periphery, said first keying element of said each plug housing being different, said first keying element of a particular plug housing being configured to receive a second keying element inside a particular optical receptacle of said different optical receptacles, said particular plug housing and said particular optical receptacle in which said first keying element receives said second keying element is a mating pair, wherein each mating pair is marked with a matching visual identification different from plug housings and receptacles having different first and second keying elements.

22. The set of optical plug housings of claim 21, wherein said second keying element of the other optical receptacles contacts said front face of said particular plug housing to prevent said particular plug housing from mating with any of said other optical receptacles.

23. The set of optical plug housings of claim 21, wherein on each said plug said first keying element is defined on said front face and said inner periphery.

24. The set of optical plug housings of claim 21, wherein on each said plug said first keying element is defined on said front face and said outer periphery.

25. The set of optical plug housings of claim 24, wherein on each said plug said first keying element extends from said inner periphery to said outer periphery.

26. The set of optical plug housings of claim 21, and wherein on each said plug said first keying element is defined on said front face and said outer periphery.

27. The set of optical plug housings of claim 21, wherein on each said plug said opening is essentially rectangular to accommodate a rectangular ferrule.

28. The set of optical plug housings of claim 21, wherein said plurality of different plug housings comprises a set of small-form factor optical plug housings, each said plug housing comprising a latch.

29. The set of optical plug housings of claim 28, wherein said plurality of different plug housings comprises MT-RJ type connector housings.

30. The set of optical plug housings of claim 21, wherein said first keying element is at a predefined position, said predefined position of said first keying element for said each plug housing being different in that the first keying element for each plug housing is located at a different position.

* * * * *